US006922826B2

(12) United States Patent
Bates et al.

(10) Patent No.: US 6,922,826 B2
(45) Date of Patent: Jul. 26, 2005

(54) DEBUGGER IMPACT REDUCTION THROUGH BREAKPOINT MOTION

(75) Inventors: Cary Lee Bates, Rochester, MN (US); William Jon Schmidt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 562 days.

(21) Appl. No.: 09/897,608

(22) Filed: Jul. 3, 2001

(65) Prior Publication Data

US 2003/0009745 A1 Jan. 9, 2003

(51) Int. Cl.[7] .............................. G06F 9/44; G06F 9/45; G06F 11/00
(52) U.S. Cl. ........................ 717/129; 717/151; 717/153; 717/160; 717/161; 714/35; 714/38
(58) Field of Search ................................ 717/129, 151, 717/153, 160, 161; 714/35, 38

(56) References Cited

U.S. PATENT DOCUMENTS

| | | | | |
|---|---|---|---|---|
| 5,471,593 A | * | 11/1995 | Branigin | 712/235 |
| 5,687,375 A | * | 11/1997 | Schwiegelshohn | 717/129 |
| 5,966,539 A | * | 10/1999 | Srivastava | 717/156 |
| 5,999,737 A | * | 12/1999 | Srivastava | 717/159 |
| 6,077,312 A | * | 6/2000 | Bates et al. | 717/129 |
| 6,226,787 B1 | * | 5/2001 | Serra et al. | 717/125 |
| 6,240,549 B1 | * | 5/2001 | Hamada et al. | 717/130 |
| 6,263,489 B1 | * | 7/2001 | Olsen et al. | 717/151 |
| 6,480,818 B1 | * | 11/2002 | Alverson et al. | 703/26 |
| 6,571,385 B1 | * | 5/2003 | Muthukumar et al. | 717/150 |
| 6,658,471 B1 | * | 12/2003 | Berry et al. | 717/150 |
| 6,708,326 B1 | * | 3/2004 | Bhattacarya | 717/124 |

OTHER PUBLICATIONS

Wahbe et al., "Practical Data Breakpoints: Design and Implementation", 1993, ACM, pp. 1–12.*
Wu et al., "A New Framework for Debugging Globally Optimized Code", 1999, ACM, pp. 181–191.*
R. Wismuller, "Debugging of Globally Optimized Programs Using Data Flow Analysis", 1994, ACM, p. 278–289.*
Grant et al., "The Benefits and Costs of DyC's Run-Time Optimizations", 2000, ACM, pp. 932–972.*
A. V. Aho et al., "Compilers, Techniques, and Tools," Addison–Wesley, 1986, Section 10.7.
D. R. Hanson et al., "A Machine–Independent Debugger," Dept. of Computer Science, Princeton University, Software—Practice and Experience, vol. 26(11), Nov. 1996, pp. 1277–1299.

* cited by examiner

Primary Examiner—Todd Ingberg
Assistant Examiner—Qamrun Nahar
(74) Attorney, Agent, or Firm—Rabin & Champagne, P.C.

(57) ABSTRACT

A first type of debugger impact reduction includes removing, from within a loop, an initial conditional breakpoint ("ICB"); extracting a first Boolean expression ("BE_1") therefrom; setting a special conditional breakpoint ("SCB") including the BE_1; and reestablishing the ICB if the SCB is satisfied. Optionally, the first type may further include extracting, from code within the loop, a second Boolean expression ("BE_2"); disjunctively including its complement in the SCB; and setting a reset breakpoint at loop exit program positions to remove reset breakpoints and/or the ICB. A second type includes setting the SCB with the complement of BE_1; and removing the ICB when the SCB is satisfied. Optionally, the second type may further include conjunctively including the BE_2 in the SCB; and setting a reset breakpoint to remove reset breakpoints and/or reestablish the ICB. The above may be embodied in a method, a program debugger and an article of manufacture.

72 Claims, 6 Drawing Sheets

```
Line  1      foo_1 (K)
      2      {
      3              Y=2
      4              for(J=0;J<10000;J++)
      5              {
      6                      A[J]=K+J;
      7              }
      8              return (K+Y);
      9      }
```

20 — ICB   =BREAK 6 WHEN K>999
22 — BE_1  =K>999
26 — SCB   =BREAK 4 WHEN K>999
     SCB'  =BREAK 4 WHEN !(K>999)
28 — RB    =BREAK 8 RESET

FIG. 5

```
Line  1    foo_2(K,FLAG)
      2    {
      3        Y=2;
      4        J=0;
      5        while(J<10000)
      6        {
      7            A[J]=K+J;
      8            if(FLAG==TRUE)
      9                K++;
     10            else
     11                return(K+Y);
     12            J++;
     13        }
     14        Y+=K;
     15        if(A[J-I]>500)
     16            return(K+Y);
     17        K-=Y;
     18        return(K-Y);
     19    }
```

20 — ICB    =BREAK 7 WHEN (K>999 && K<1050)
22 — BE_1   =((K>999) && (K<1050))
24 — BE_2   =(!(FLAG==TRUE))
26 — SCB    =BREAK 4 WHEN ( (K>999 && K<1050) || (FLAG==TRUE) )
     SCB'   =BREAK 4 WHEN ( (!(K>999 && K<1050)) && (!(FLAG==TRUE)) )
28 — RB_1   =BREAK 11 RESET
     RB_2   =BREAK 14 RESET

FIG. 6

DEBUGGER IMPACT REDUCTION THROUGH BREAKPOINT MOTION

BACKGROUND OF THE INVENTION

1. Field of the Invention

The invention relates to debugger impact reduction through breakpoint motion.

2. Background Information

A debugger is a software tool used by programmers in software development to identify and correct program errors within a program. To support the debugger, information describing symbols and types in the program as well as information to map between source lines and the binary code may be provided by a compiler and/or an interpreter ("compiler"). This extra information, generally referred to as debugging information, enables the programmer to examine the types, variables and data structures by name and to follow the execution of the program through the source code.

With a debugger, programmers may "step" through program code statements one at a time, while the corresponding machine instructions are being executed. As programmers step through code, they may, inter alia, concurrently monitor changes in certain variables, which assists in identifying and correcting program errors.

With a debugger, a programmer may also set a breakpoint at a specific program position. When the program is executed, the debugger will stop execution of the program at any breakpoint encountered, and may display various programming elements, such as software variables for example, to assist in the debugging process.

Debuggers may also allow programmers to define and set conditional breakpoints. A conditional breakpoint is a breakpoint that has an associated Boolean expression. Upon encountering a conditional breakpoint, a debugger will only stop execution of the program if the associated Boolean expression is evaluated by the debugger to be TRUE (i.e., satisfied). For example, a conditional breakpoint may be BREAK 6 IF K<999. Accordingly, a debugger would only stop execution of the program at the location of such a conditional breakpoint (here, line 6) if the variable K is less than the value 999 when the conditional breakpoint is encountered.

In today's software development environment, many new software applications are threaded. As such, they are designed to efficiently execute in multitasking or multiprocessing environments, which allow multiple threads, or streams of execution, to execute concurrently. With the increased frequency of threaded applications, programming timing errors are becoming more common than ever.

A significant problem with debugging program timing errors is that the introduction of breakpoints may dramatically affect program timing, which may make difficult or impossible the reproduction of program errors in the debugging environment. While conditional breakpoints may affect overall program timing less than normal breakpoints and program code stepping, they still require a short amount of time for their associated Boolean expressions to be evaluated. Although this short amount of time may be tolerable in some cases, where the conditional breakpoint is encountered a large number of times, program timing may be so significantly affected that reproducing program errors in a debugging environment may be difficult or impossible.

A frequently occurring situation in which a conditional breakpoint may be encountered a large number of times is where the breakpoint is set within a program loop. A program loop is a repetition within a program, and may iterate a large number of times. Therefore, where a conditional breakpoint is set within a program loop, program timing is more likely to be substantially affected, and accordingly, the difficulty or impossibility of reproducing program errors in the debugging environment becomes more likely.

Therefore, there is a need for debugger impact reduction.

SUMMARY OF THE INVENTION

It is, therefore, a principal object of this invention to provide debugger impact reduction through breakpoint motion.

It is another object of the invention to provide debugger impact reduction through breakpoint motion that assists in minimizing the above mentioned problems.

These and other objects of the present invention are accomplished by debugger impact reduction through breakpoint motion as disclosed herein.

In an exemplary aspect of the invention, a method of reducing debugger impact through conditional breakpoint motion comprises: extracting, from an initial conditional breakpoint within a program loop, a first Boolean expression that is at least partially invariant within the loop; setting, at a pre-ICB (pre-initial conditional breakpoint, see infra) program position, a special conditional breakpoint that includes the first Boolean expression; removing the initial conditional breakpoint; and if the special conditional breakpoint is satisfied, reestablishing the initial conditional breakpoint.

In a further exemplary aspect of the invention, a method of reducing debugger impact through conditional breakpoint motion may further comprise: extracting, from the program code within the loop, a second Boolean expression that is invariant within the loop, where the special conditional breakpoint disjunctively includes the complement of the second Boolean expression, and the first Boolean expression is invariant within the loop when the second Boolean expression is satisfied.

In another exemplary aspect of the invention, a method of reducing debugger impact through conditional breakpoint motion may further comprise: setting, at one or more loop exit program positions, a reset breakpoint; and if one of the reset breakpoints is satisfied, removing the reset breakpoints and/or the initial conditional breakpoint.

In an alternative exemplary aspect of the invention, a method of reducing debugger impact through conditional breakpoint motion may comprise: extracting, from an initial conditional breakpoint within a program loop, a first Boolean expression that is at least partially invariant within the loop; setting, at a pre-ICB program position, a special conditional breakpoint that includes the complement of the first Boolean expression; and if the special conditional breakpoint is satisfied, removing the initial conditional breakpoint.

In a further alternative exemplary aspect of the invention, a method of reducing debugger impact through conditional breakpoint motion may further comprise: extracting, from the program code within the loop, a second Boolean expression that is invariant within the loop, where the special conditional breakpoint conjunctively includes the second Boolean expression, and the first Boolean expression is invariant within the loop when the second Boolean expression is satisfied.

In another alternative exemplary aspect of the invention, a method of reducing debugger impact through conditional breakpoint motion may further comprise: setting, at one or more loop exit program positions, a reset breakpoint; and if one of the reset breakpoints is satisfied, removing the reset breakpoints and/or reestablishing the initial conditional breakpoint.

Thus, the present invention, inter alia, creates a state that assists in avoiding unnecessary evaluations of a conditional breakpoint within a program loop.

Each of the above aspects may be embodied in a method, a debugger, and an article of manufacture comprising a computer readable program storage medium tangibly embodying one or more programs of instructions executable by a computer.

BRIEF DESCRIPTION OF THE DRAWINGS

FIG. 5 illustrates an exemplary set of program code used to describe the methods of FIGS. 1–4 in operation.

FIG. 6 illustrates another exemplary set of program code used to describe the methods of FIGS. 1–4 in operation.

DETAILED DESCRIPTION

The invention will now be described in more detail by way of example with reference to the illustrative embodiments shown in the accompanying figures. It should be kept in mind that the following described embodiments are only presented by way of example and should not be construed as limiting the inventive concept to any particular configuration or order.

Figure 1:
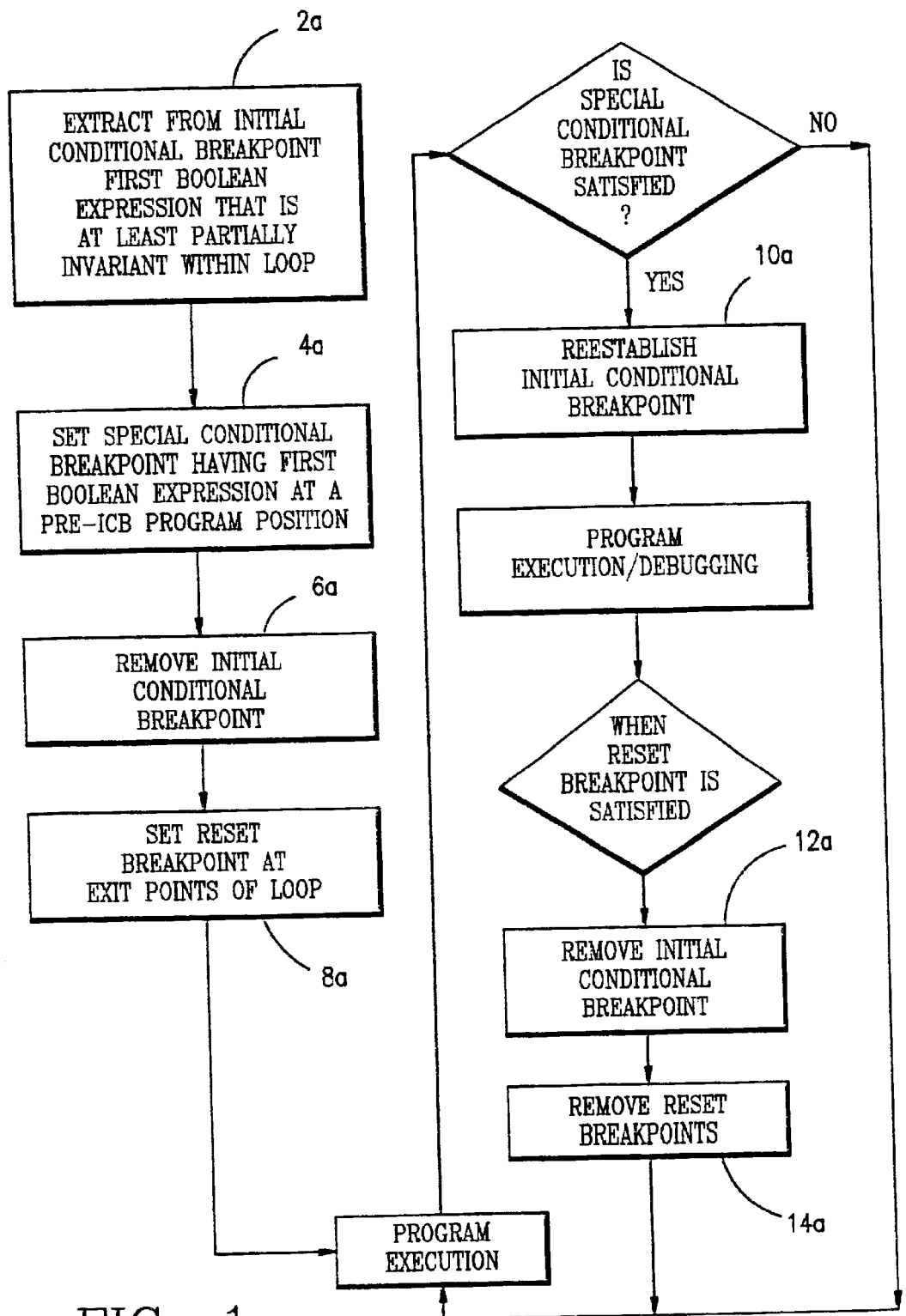
FIG. 1 is a flow diagram illustrating debugger impact reduction through conditional breakpoint motion with optional reset breakpoints, according to a first class of embodiments of the invention.

As shown in FIG. 1, in an exemplary aspect of the invention, a debugger (not shown) may effectuate conditional breakpoint motion through a first Boolean expression extraction (block 2a); a special conditional breakpoint setting (block 4a); an initial conditional breakpoint removal (block 6a); an optional reset breakpoint setting (block 8a); an initial conditional breakpoint reestablishment (block 10a); an optional subsequent initial conditional breakpoint removal (block 12a), and an optional reset breakpoint removal (block 14a).

Figure 2:
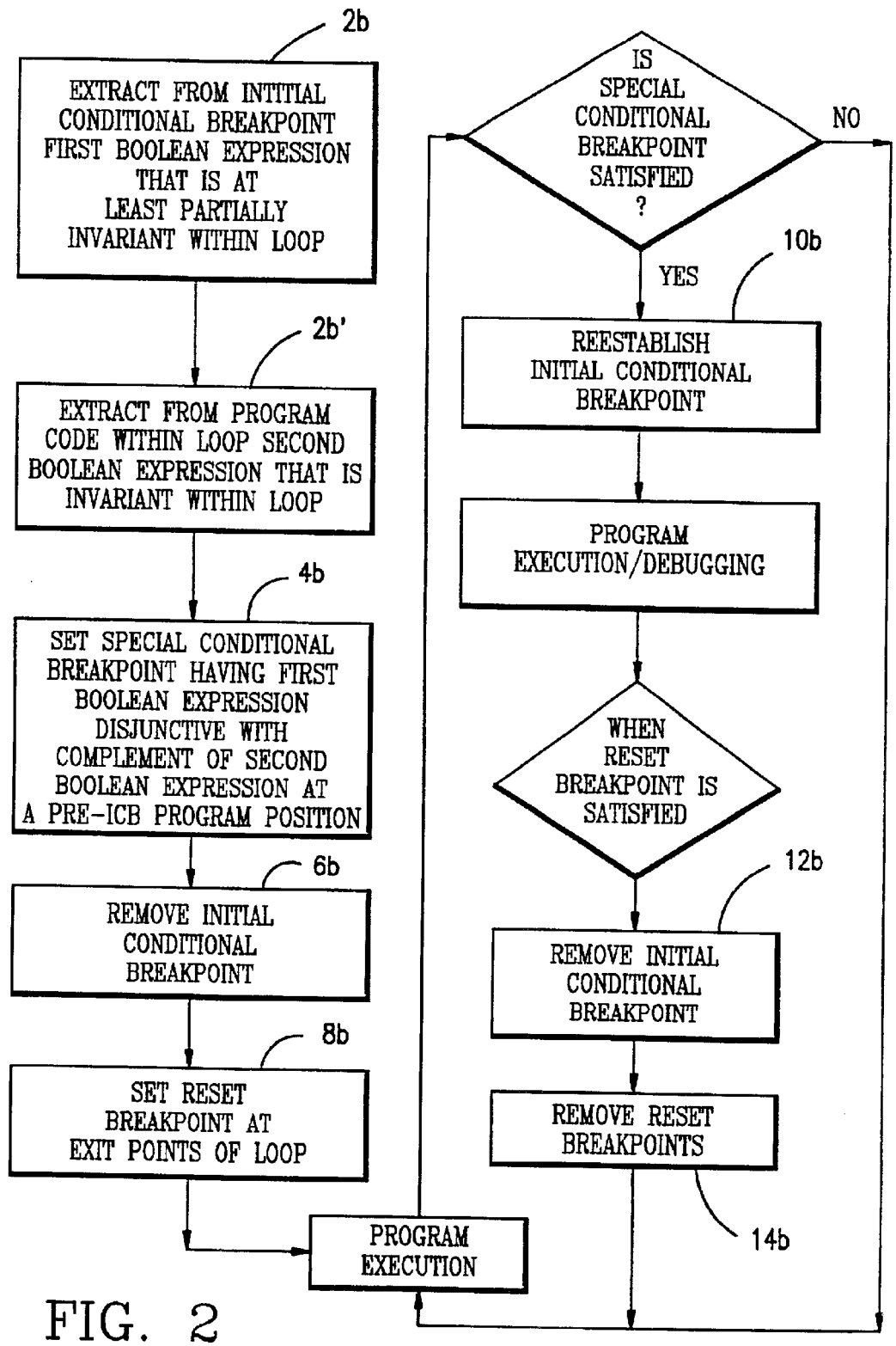
FIG. 2 is a flow diagram illustrating debugger impact reduction, with optional reset breakpoints, and having an additional Boolean expression extraction and a modified special conditional breakpoint setting, according to the first class of embodiments.

FIG. 2 illustrates another exemplary aspect of the invention, in which a debugger (not shown) may effectuate conditional breakpoint motion through, inter alia, a second, additional, Boolean expression extraction (block 2b') and a modified special conditional breakpoint setting (block 4b).

Figure 3:
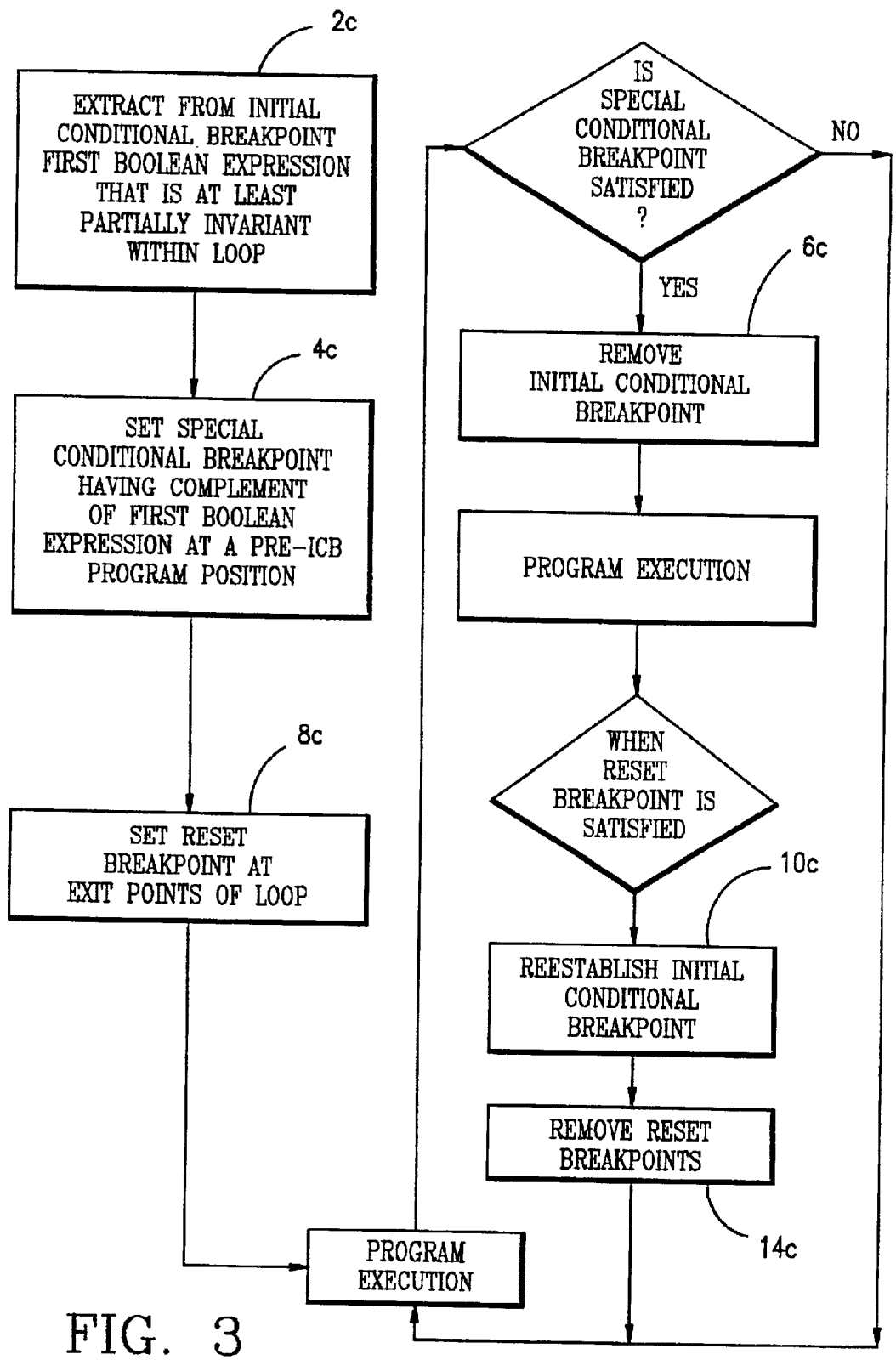
FIG. 3 is a flow diagram illustrating debugger impact reduction with optional reset breakpoints, according to a second class of embodiments of the invention.

As shown in FIG. 3, in an alternative exemplary aspect of the invention, a debugger (not shown) may effectuate conditional breakpoint motion through a first Boolean expression extraction (block 2c); a special conditional breakpoint setting (block 4c); an optional reset breakpoint setting (block 8c); an initial conditional breakpoint removal (block 6c); an optional conditional breakpoint reestablishment (block 10c); and an optional reset breakpoint removal (block 14c).

Figure 4:
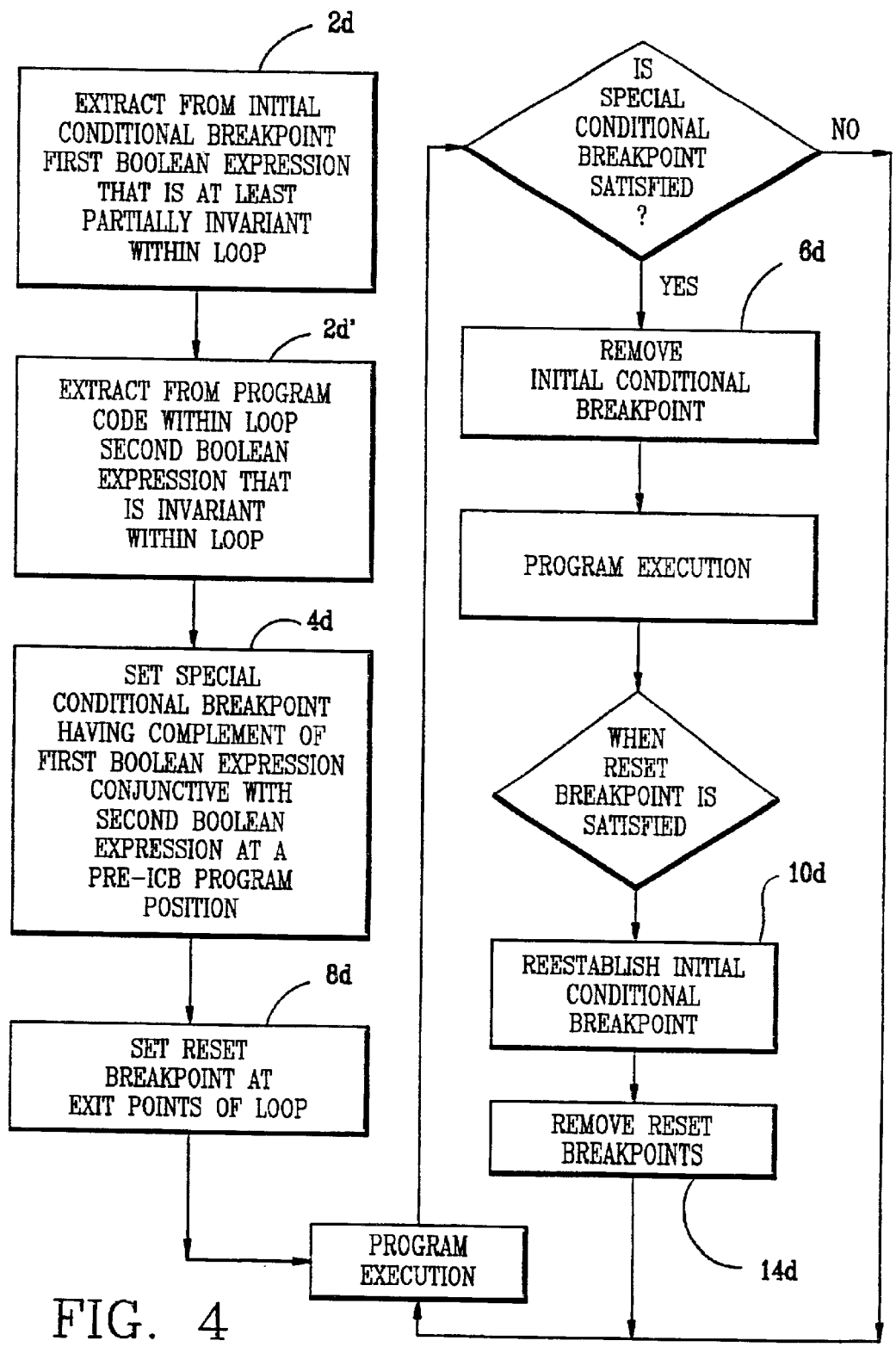
FIG. 4 is a flow diagram illustrating debugger impact reduction, with optional reset breakpoints, and having an additional Boolean expression extraction and a modified special conditional breakpoint setting, according to the second class of embodiments.

FIG. 4 illustrates another alternative exemplary aspect of the invention, in which a debugger (not shown) may effectuate conditional breakpoint motion through, inter alia, a second, additional, Boolean expression extraction (block 2d') and a modified special conditional breakpoint setting (block 4d).

Reference is now also made to FIGS. 5 and 6 to illustrate exemplary breakpoint motions by a debugger (not shown) according to the invention as illustrated in FIGS. 1–4. FIGS. 5 and 6 illustrate exemplary sets of program code containing exemplary conditional breakpoints within exemplary program loops.

In a first Boolean expression extraction (blocks 2a–d), a debugger extracts, from an initial conditional breakpoint 20 within a program loop, a first Boolean expression 22 (labeled as "BE_1" in FIGS. 5 and 6) that is at least partially invariant within the loop.

In FIG. 5, initial conditional breakpoint 20 has been set at line 6, which is within a for-loop, and contains first Boolean expression 22 ("K>999"), which is, in this example, completely invariant within the loop, as its evaluation will not be affected by code within the loop.

FIG. 6 illustrates, inter alia, that first Boolean expression 22 may be a compound Boolean expression, which contains a plurality of propositions, but nonetheless, may be treated as a single Boolean expression for evaluation purposes.

As shown in FIG. 6, initial conditional breakpoint 20 has been set at line 7, which is within a while-loop, and contains first Boolean expression 22 ("(K>999) && (K<1050)"), which is partially invariant with the loop, as its evaluation is subject to change by code within the loop only upon satisfaction of a condition that is invariant within the loop (i.e., second Boolean expression 24, as discussed below).

Referring again to FIG. 6, in a modified extraction step (blocks 2b' and 2d' of FIGS. 2 and 4), where first Boolean expression 22 is partially invariant within the loop, the debugger extracts from program code within the loop second Boolean expression 24 (labeled as "BE_2" in FIG. 6) that is invariant within the loop, as its evaluation is not subject to change by code within the loop. In FIG. 6, the debugger will recognize that first Boolean expression 22 ("((K>999) && (K<1050))") is invariant within the loop when the condition contained in line 8 ("if (FLAG==TRUE)") is not satisfied. Thus, the debugger may extract second Boolean expression 24 as "(!(FLAG==TRUE))".

It should be noted that, as with first Boolean expression 22, second Boolean expression 24 may also be a compound Boolean expression. Further, first and second Boolean expressions 22, 24 may be extracted from a plurality of lines of code (e.g., from nested if-statements, combinations of if-statements and loop control expressions, etc.), and treated as a single Boolean expression for evaluation purposes.

In a special conditional breakpoint setting (blocks 4a–d), the debugger sets special conditional breakpoint 26 at a pre-ICB program position. A pre-ICB program position may be a program position that would be reached before, or when, the initial conditional breakpoint 20 is reached, but nonetheless, evaluated before initial conditional breakpoint 20 would be evaluated.

As shown in FIGS. 1 and 2, in a first class of embodiments, initial conditional breakpoint 20 is removed at the outset, and thereafter reestablished (blocks 10a and 10b) if special conditional breakpoint 26 is satisfied. Therefore, according to this first class of embodiments, special conditional breakpoint 26 may be defined to be satisfied when initial conditional breakpoint 20 would be satisfied (where first Boolean expression 20 is completely invariant within the loop); or when initial conditional breakpoint 20 would be satisfied or first Boolean expression 22 would be variant within the loop (where first Boolean expression is partially invariant within the loop).

Thus, according to the first class of embodiments, in FIG. 5, the debugger sets, at line 4, special conditional breakpoint 26 (labeled as "SCB") having first Boolean expression 22, as "BREAK 4 WHEN K>999"; while in FIG. 6, the debugger sets, at line 4, special conditional breakpoint (also labeled as "SCB"), having first Boolean expression disjunctively with the complement of second Boolean expression 24, as "BREAK 4 WHEN ((K>999) && (K<1050))||(FLAG=TRUE))".

As shown in FIGS. 3 and 4, in a second class of embodiments, initial conditional breakpoint 20 is not removed at the outset, but removed (blocks 10c and 10d) if special conditional breakpoint 26 is satisfied. Therefore, according to the second class of embodiments, special conditional breakpoint 26 may be defined to be satisfied when initial conditional breakpoint 20 would not be satisfied (where first Boolean expression 20 is completely invariant within the loop); or when initial conditional breakpoint 20 would be not satisfied and first Boolean expression 22 would be invariant within the loop (where first Boolean expression is partially invariant within the loop).

Thus, according to the second class of embodiments, in FIG. 5, the debugger sets, at line 4, special conditional breakpoint 26 (labeled as "SCB'") having the complement of first Boolean expression 22, as "BREAK 4 WHEN !(K>999) "; while in FIG. 6, the debugger sets, at line 4, special conditional breakpoint (also labeled as "SCB'"), having the complement of first Boolean expression conjunctively with second Boolean expression 24, as "BREAK 4 WHEN ((!(K>999 && K<1050)) && (!(FLAG=TRUE)))".

In an initial conditional breakpoint removal (blocks 6a–d and 12a–b), the debugger removes the initial conditional breakpoint from its program position within the loop.

It should be noted that a program loop may be encountered only once during execution of the program. However, a program loop may be encountered multiple times during execution of a program. Therefore, the present invention includes setting one or more optional reset breakpoints to accommodate program loops that may be encountered multiple times.

In an optional reset breakpoint setting (blocks 8a–d), the debugger may set a reset breakpoint 28 (discussed in more detail below) at one or more loop exit program positions. In FIG. 5, the debugger sets a reset breakpoint 28 at line 8; while in FIG. 6, the debugger sets a reset breakpoint at lines 11 and 14.

It should be noted that a loop exit program position may be a program position that would be reached after, or as, the loop finishes iterating, but nonetheless, before the special conditional breakpoint 26 is subsequently evaluated. A loop exit position may be within the loop itself, as is illustrated in FIG. 6, in which a reset breakpoint 28 is set within the loop at line 11; or outside the loop, as is illustrated in FIG. 5, in which a reset breakpoint is set outside the loop at line 8. Further, a loop exit position may even share the position of special conditional breakpoint 26, as long as reset breakpoint 28 is processed before evaluation of special conditional breakpoint.

With the first exemplary class of embodiments, after removing initial conditional breakpoint 20 and setting special conditional breakpoint 26, the debugger creates a state that assists in avoiding unnecessary evaluations of first Boolean expression 22 that may have occurred within the program loop via initial conditional breakpoint 20. Regarding the second exemplary class of embodiments, after setting special conditional breakpoint 26, the debugger creates a similar state. From either of these states, the debugger may allow the program to execute, during which special conditional breakpoint 26 may be subsequently satisfied.

As shown in FIGS. 1 and 2, regarding the first class of embodiments, if special conditional breakpoint 26 is satisfied, through an initial conditional breakpoint reestablishment (blocks 10a and 10b) subsequent program execution may be halted as initially intended by the programmer at initial conditional breakpoint 20. Thus, the programmer may debug the program as initially desired, and when ready, allow the program to further execute. When program execution reaches a reset breakpoint 28, an optional subsequent initial conditional breakpoint removal (blocks 12a and 12b) and/or an optional reset breakpoint removal (blocks 14a and 14b) may be effectuated leaving special conditional breakpoint 26 set for further breakpoint impact reduction.

Referring now to FIGS. 3 and 4, regarding the second exemplary class of embodiments, if special conditional breakpoint 26 is satisfied, through an initial conditional breakpoint removal (blocks 6c and 6d) the timing of subsequent program execution will not be affected by the unnecessary evaluation of initial conditional breakpoint 20. When program execution reaches a reset breakpoint 28, an optional initial conditional breakpoint reestablishment (blocks 10c and 10d) and/or an optional reset breakpoint removal (blocks 14c and 14d) may be effectuated leaving special conditional breakpoint 26 set for further breakpoint impact reduction.

It should be understood, however, that the invention is not necessarily limited to the specific process, order, arrangement and components shown and described above, and may be susceptible to numerous variations within the scope of the invention. For example, although the above-described exemplary aspects of the invention are believed to be particularly well suited for reducing debugger impact with for-loops and while-loops, it is contemplated that the concepts of the present invention can be adapted for various types of programming loop and programming language syntaxes. For example, the concepts of the present application can be utilized with a do-while-loop, a goto-loop, etc., in Assembly, Basic, C, C++, etc.

It will be apparent to one skilled in the art that the manner of making and using the claimed invention has been adequately disclosed in the above-written description of the embodiments taken together with the drawings. Further, it will be apparent that the above methods may be readily embodied in a method, a software debugger, and a computer program medium, which may be any form of a computer program medium readable by a computer, such as, for example, a CD-ROM, RAM, a hard drive, a cache, etc.

It will be understood that the above description of the embodiments of the present invention are susceptible to various modifications, changes, and adaptations, and the same are intended to be comprehended within the meaning and range of equivalents of the appended claims.

What is claimed is:

1. A computer-readable medium encoded with a program debugger, for use in a programming environment, comprising:
means for extracting, from an initial conditional breakpoint within a program loop, a first Boolean expression that is at least partially invariant within the loop;
means for removing said initial conditional breakpoint;
means for setting, at a pre-initial conditional breakpoint program position, a special conditional breakpoint that includes said first Boolean expression; and
means for reestablishing said initial conditional breakpoint if said special conditional breakpoint is satisfied.

2. The computer-readable medium of claim 1, wherein said first Boolean expression is completely invariant within the loop.

3. The computer-readable medium of claim 1, further comprising:
means for setting, at a first loop exit program position, a first reset breakpoint; and
means for removing said initial conditional breakpoint if said first reset breakpoint is satisfied.

4. The computer-readable medium of claim 3, further comprising:
means for removing said first reset breakpoint if said first reset breakpoint is satisfied.

5. The computer-readable medium of claim 3, further comprising:
means for setting, at a second loop exit program position, a second reset breakpoint; and
means for removing said initial conditional breakpoint if one of said first and second reset breakpoints is satisfied.

6. The computer-readable medium of claim 5, further comprising:
means for removing said first and second reset breakpoints if one of said first and second reset breakpoints is satisfied.

7. The computer-readable medium of claim 1, further comprising:
means for extracting, from program code within the loop, a second Boolean expression that is invariant within the loop,
wherein said special conditional breakpoint disjunctively includes the complement of said second Boolean expression, and said first Boolean expression is invariant within the loop when said second Boolean expression is satisfied.

8. The computer-readable medium of claim 7, further comprising:
means for setting, at a first loop exit program position, a first reset breakpoint; and
means for removing said initial conditional breakpoint if said first reset breakpoint is satisfied.

9. The computer-readable medium of claim 8, further comprising:
means for removing said first reset breakpoint if said first reset breakpoint is satisfied.

10. The computer-readable medium of claim 8, further comprising:
means for setting, at a second loop exit program position, a second reset breakpoint; and
means for removing said initial conditional breakpoint if one of said first and second reset breakpoints is satisfied.

11. The computer-readable medium of claim 10, further comprising:
means for removing said first and second reset breakpoints if one of said first and second reset breakpoints is satisfied.

12. The computer-readable medium of claim 1, wherein the initial conditional breakpoint occurs at a program statement in the loop that has been designated by an operator of the program debugger.

13. A method of reducing debugger impact through conditional breakpoint motion, comprising:
extracting, from an initial conditional breakpoint within a program loop, a first Boolean expression that is at least partially invariant within the loop;
removing said initial conditional breakpoint;
setting, at a pre-initial conditional breakpoint program position, a special conditional breakpoint that includes said first Boolean expression; and
if said special conditional breakpoint is satisfied, reestablishing said initial conditional breakpoint.

14. The method of claim 13, wherein said first Boolean expression is completely invariant within the loop.

15. The method of claim 13, further comprising:
setting, at a first loop exit program position, a first reset breakpoint; and
if said first reset breakpoint is satisfied, removing said initial conditional breakpoint.

16. The method of claim 15, further comprising:
if said first reset breakpoint is satisfied, removing said first reset breakpoint.

17. The method of claim 15, further comprising:
setting, at a second loop exit program position, a second reset breakpoint; and
if one of said first and second reset breakpoints is satisfied, removing said initial conditional breakpoint.

18. The method of claim 17, further comprising:
if one of said first and second reset breakpoints is satisfied, removing said first and second reset breakpoints.

19. The method of claim 13, further comprising:
extracting, from program code within the loop, a second Boolean expression that is invariant within the loop,
wherein said special conditional breakpoint disjunctively includes the complement of said second Boolean expression, and said first Boolean expression is invariant within the loop when said second Boolean expression is satisfied.

20. The method of claim 19, further comprising:
setting, at a first loop exit program position, a first reset breakpoint; and
if said first reset breakpoint is satisfied, removing said initial conditional breakpoint.

21. The method of claim 20, further comprising:
if said first reset breakpoint is satisfied, removing said first reset breakpoint.

22. The method of claim 20, further comprising:
setting, at a second loop exit program position, a second reset breakpoint; and
if one of said first and second reset breakpoints is satisfied, removing said initial conditional breakpoint.

23. The method of claim 22, further comprising:
if one of said first and second reset breakpoints is satisfied, removing said first and second reset breakpoints.

24. The method of claim 13, wherein the initial conditional breakpoint occurs at a program statement in the loop that has been designated by an operator of the program debugger.

25. An article of manufacture comprising a computer program medium readable by a computer and embodying one or more instructions executable by the computer to perform a method of reducing debugger impact through conditional breakpoint motion, the method comprising:

extracting, from an initial conditional breakpoint within a program loop, a first Boolean expression that is at least partially invariant within the loop;

removing said initial conditional breakpoint;

setting, at a pre-initial conditional breakpoint program position, a special conditional breakpoint that includes said first Boolean expression; and if said special conditional breakpoint is satisfied, reestablishing said initial conditional breakpoint.

26. The article of manufacture of claim 25, wherein the first Boolean expression is completely invariant within the loop.

27. The article of manufacture of claim 25, wherein the method further comprises:

setting, at a first loop exit program position, a first reset breakpoint; and if said first reset breakpoint is satisfied, removing said initial conditional breakpoint.

28. The article of manufacture of claim 27, wherein the method further comprises:

if said first reset breakpoint is satisfied, removing said first reset breakpoint.

29. The article of manufacture of claim 27, wherein the method further comprises:

setting, at a second loop exit program position, a second reset breakpoint; and if one of said first and second reset breakpoints is satisfied, removing said initial conditional breakpoint.

30. The article of manufacture of claim 29, wherein the method further comprises:

if one of said first and second reset breakpoints is satisfied, removing said first and second reset breakpoints.

31. The article of manufacture of claim 25, wherein said first Boolean expression is partially invariant within the loop, and the method further comprises:

extracting, from program code within the loop, a second Boolean expression that is invariant within the loop, wherein said special conditional breakpoint disjunctively includes the complement of said second Boolean expression, and said first Boolean expression is invariant within the loop when said second Boolean expression is satisfied.

32. The article of manufacture of claim 31, wherein the method further comprises:

setting, at a first loop exit program position, a first reset breakpoint; and if said first reset breakpoint is satisfied, removing said initial conditional breakpoint.

33. The article of manufacture of claim 32, wherein the method further comprises:

if said first reset breakpoint is satisfied, removing said first reset breakpoint.

34. The article of manufacture of claim 32, wherein the method further comprises:

setting, at a second loop exit program position, a second reset breakpoint; and if one of said first and second reset breakpoints is satisfied, removing said initial conditional breakpoint.

35. The article of manufacture of claim 34, wherein the method further comprises:

if one of said first and second reset breakpoints is satisfied, removing said first and second reset breakpoints.

36. The article of manufacture of claim 25, wherein the initial conditional breakpoint occurs at a program statement in the loop that has been designated by an operator of the program debugger.

37. A computer-readable medium encoded with a program debugger, for use in a programming environment, comprising:

means for extracting, from an initial conditional breakpoint within a program loop, a first Boolean expression that is at least partially invariant within the loop;

means for setting, at a pre-initial conditional breakpoint program position, a special conditional breakpoint that includes the complement of said first Boolean expression; and means for removing said initial conditional breakpoint if said special conditional breakpoint is satisfied.

38. The computer-readable medium of claim 37, wherein said first Boolean expression is completely invariant within the loop.

39. The computer-readable medium of claim 37, further comprising:

means for setting, at a first loop exit program position, a first reset breakpoint; and means for reestablishing said initial conditional breakpoint if said first reset breakpoint is satisfied.

40. The computer-readable medium of claim 39, further comprising:

means for removing said first reset breakpoint if said first reset breakpoint is satisfied.

41. The computer-readable medium of claim 39, further comprising:

means for setting, at a second loop exit program position, a second reset breakpoint; and means for reestablishing said initial conditional breakpoint if one of said first and second reset breakpoints is satisfied.

42. The computer-readable medium of claim 41, further comprising:

means for removing said first and second reset breakpoints if one of said first and second reset breakpoints is satisfied.

43. The computer-readable medium of claim 37, wherein said first Boolean expression is partially invariant within the loop, and said program debugger further comprises:

means for extracting, from program code within the loop, a second Boolean expression that is invariant within the loop, wherein said special conditional breakpoint conjunctively includes said second Boolean expression, and said first Boolean expression is invariant within the loop when said second Boolean expression is satisfied.

44. The computer-readable medium of claim 43, further comprising:

means for setting, at a first loop exit program position, a first reset breakpoint; and means for reestablishing said initial conditional breakpoint if said first reset breakpoint is satisfied.

45. The computer-readable medium of claim 44, further comprising:
  means for removing said first reset breakpoint if said first reset breakpoint is satisfied.

46. The computer-readable medium of claim 44, further comprising:
  means for setting, at a second loop exit program position, a second reset breakpoint; and
  means for reestablishing said initial conditional breakpoint if one of said first and second reset breakpoints is satisfied.

47. The computer-readable medium of claim 46, further comprising:
  means for removing said first and second reset breakpoints if one of said first and second reset breakpoints is satisfied.

48. The computer-readable medium of claim 37, wherein the initial conditional breakpoint occurs at a program statement in the loop that has been designated by an operator of the program debugger.

49. A method of reducing debugger impact through conditional breakpoint motion, comprising:
  extracting, from an initial conditional breakpoint within a program loop, a first Boolean expression that is at least partially invariant within the loop;
  setting, at a pre-initial conditional breakpoint program position, a special conditional breakpoint that includes the complement of said first Boolean expression; and
  if said special conditional breakpoint is satisfied, removing said initial conditional breakpoint.

50. The method of claim 49, wherein said first Boolean expression is completely invariant within the loop.

51. The method of claim 49, further comprising:
  setting, at a first loop exit program position, a first reset breakpoint; and
  if said first reset breakpoint is satisfied, reestablishing said initial conditional breakpoint.

52. The method of claim 51, further comprising:
  if said first reset breakpoint is satisfied, removing said first reset breakpoint.

53. The method of claim 51, further comprising:
  setting, at a second loop exit program position, a second reset breakpoint; and
  if one of said first and second reset breakpoints is satisfied, reestablishing said initial conditional breakpoint.

54. The method of claim 53, further comprising:
  if one of said first and second reset breakpoints is satisfied, removing said first and second reset breakpoints.

55. The method of claim 49, further comprising:
  extracting, from the program code within the loop, a second Boolean expression that is invariant within the loop,
  wherein said special conditional breakpoint conjunctively includes said second Boolean expression, and said first Boolean expression is invariant within the loop when said second Boolean expression is satisfied.

56. The method of claim 55, further comprising:
  setting, at a first loop exit program position, a first reset breakpoint; and
  if said first reset breakpoint is satisfied, reestablishing said initial conditional breakpoint.

57. The method of claim 56, further comprising:
  if said first reset breakpoint is satisfied, removing said first reset breakpoint.

58. The method of claim 56, further comprising:
  setting, at a second loop exit program position, a second reset breakpoint; and
  if one of said first and second reset breakpoints is satisfied, reestablishing said initial conditional breakpoint.

59. The method of claim 58, further comprising:
  if one of said first and second reset breakpoints is satisfied, removing said first and second reset breakpoints.

60. The method of claim 49, wherein the initial conditional breakpoint occurs at a program statement in the loop that has been designated by an operator of the program debugger.

61. An article of manufacture comprising a computer program medium readable by a computer and embodying one or more instructions executable by the computer to perform a method of reducing debugger impact through conditional breakpoint motion, the method comprising:
  extracting, from an initial conditional breakpoint within a program loop, a first Boolean expression that is at least partially invariant within the loop;
  setting, at a pre-initial conditional breakpoint program position, a special conditional breakpoint that includes the complement of said first Boolean expression; and
  if said special conditional breakpoint is satisfied, removing said initial conditional breakpoint.

62. The article of manufacture of claim 61, wherein said first Boolean expression is completely invariant within the loop.

63. The article of manufacture of claim 61, wherein the method further comprises:
  setting, at a first loop exit program position, a first reset breakpoint; and
  if said first reset breakpoint is satisfied, reestablishing said initial conditional breakpoint.

64. The article of manufacture of claim 63, wherein the method further comprises:
  if said first reset breakpoint is satisfied, removing said first reset breakpoint.

65. The article of manufacture of claim 63, wherein the method further comprises:
  setting, at a second loop exit program position, a second reset breakpoint; and
  if one of said first and second reset breakpoints is satisfied, reestablishing said initial conditional breakpoint.

66. The article of manufacture of claim 65, wherein the method further comprises:
  if one of said first and second reset breakpoints is satisfied, removing said first and second reset breakpoints.

67. The article of manufacture of claim 61, wherein the method further comprises:
  extracting, from the program code within the loop, a second Boolean expression that is invariant within the loop,
  wherein said special conditional breakpoint conjunctively includes said second Boolean expression, and said first Boolean expression is invariant within the loop when said second Boolean expression is satisfied.

68. The article of manufacture of claim 57, wherein the method further comprises:

setting, at a first loop exit program position, a first reset breakpoint; and if said first reset breakpoint is satisfied, reestablishing said initial conditional breakpoint.

69. The article of manufacture of claim 68, wherein the method further comprises:

if said first reset breakpoint is satisfied, removing said first reset breakpoint.

70. The article of manufacture of claim 68, wherein the method further comprises:

setting, at a second loop exit program position, a second reset breakpoint; and if one of said first and second reset breakpoints is satisfied, reestablishing said initial conditional breakpoint.

71. The article of manufacture of claim 70, wherein the method further comprises:

if one of said first and second reset breakpoints is satisfied, removing said first and second reset breakpoints.

72. The article of manufacture of claim 61, wherein the initial conditional breakpoint occurs at a program statement in the loop that has been designated by an operator of the program debugger.

* * * * *